Figure 1:
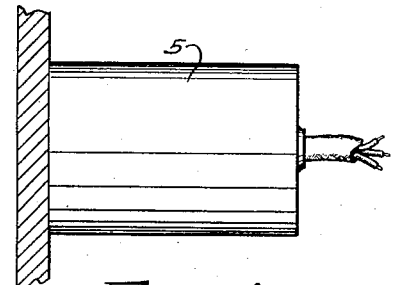

April 9, 1929. M. J. KALTENBACH 1,708,698

SOUND DETECTOR

Filed April 5, 1926

Inventor
Mathew J. Kaltenbach
By Peter Machlin Golnick & Tease
Attorneys

Patented Apr. 9, 1929.

1,708,698

UNITED STATES PATENT OFFICE.

MATHEW J. KALTENBACH, OF ROCKY RIVER, OHIO.

SOUND DETECTOR.

Application filed April 5, 1926. Serial No. 99,793.

This invention relates to sound detecting devices and more particularly to the construction of such a device that will give uniform results and be adapted to be positioned at a distance from the user and maintain its position without external manual assistance.

In carrying out the objects of my invention I use a microphone which is well known, that is the arrangement of carbon granules between two diaphragms so that variation of pressure on the diaphragms varies the resistance offered by the carbon. Such a device can be found in any telephone transmitter. It has been found that a microphone can be used to advantage in bringing it into contact with a member the vibration of which it is desired to determine. The microphone is of course connected in a circuit with a battery and a telephone receiver, or a galvanometer so that the vibration of the member will effect a change in flow of current through the microphone. This principle has been found to be well adapted to locating knocks or disturbances in internal combustion engines or the like where the ear alone is unable to determine the specific location of the trouble.

To take advantage of this phenomenon it has been common practice to mount a microphone on the end of a rod or sleeve so that one end of the rod may be brought into contact with the part of the mechanism where the trouble is thought to exist. Thus with the aid of telephone receivers the variation in current creates a variation in sound due to the vibration transmitted to the microphone and will then indicate the proximity of the source of trouble. One may become skilled in the use of such an instrument and can determine with surprising accuracy, not only the location of the sound but also the nature of the trouble.

There are, however, distinct limitations to the use of such an apparatus and it is with overcoming such limitations that this invention is chiefly concerned. When the microphone or the member to which it is attached is urged into contact with the mechanism by hand there is present the ever varying human element which determines the intimacy of contact between the rod and the mechanism. This of course gives a variation in results which is apt to confuse the most skilled user. It can be seen that where the user is forced to apply the rod from different angles and in more or less confined spaces the variation in contact pressure will be very great. There is also, particularly in trying to locate mechanical difficulty about an automobile or aircraft, the problem of using a microphone while the car or plane is in motion. It may be desired to listen to the transmission bearings or even to the differential bearings of the automobile for the sake of locating trouble or determining the need for adjustment. This can only be done with satisfaction while the car is being driven at operating speeds and it has been found that all the known devices offer insurmountable difficulties in trying to adapt them to this use.

Therefore it is among the objects of my invention to provide a mounting for a microphone that will insure a constant pressure between the mounting and the member against which it is desired to place it. Another object is to so construct the mounting that the device will hold itself in place when and wherever it is put by the user.

Figure 2:
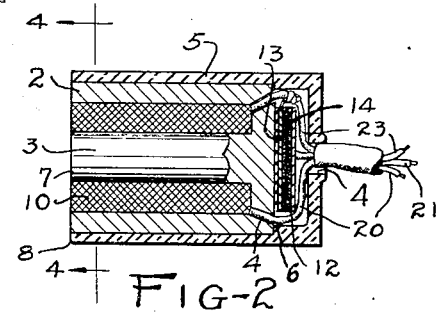
Figure 3:
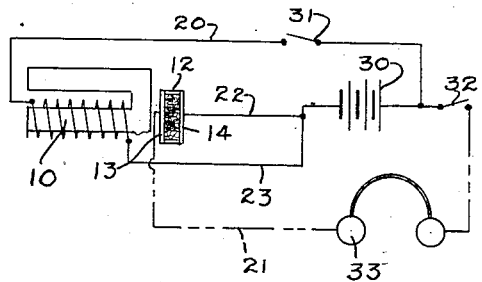
Figure 4:
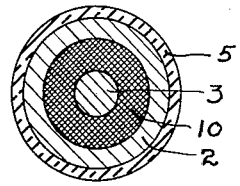
Figure 5:
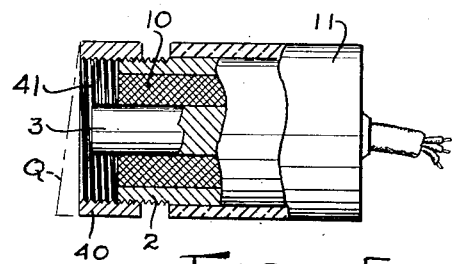
Figure 6:
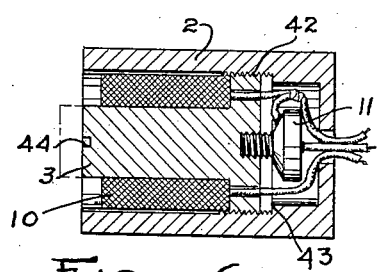
Figure 7:
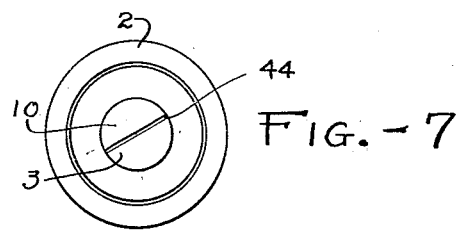

In the drawings Fig. 1 illustrates my device clinging to a metallic surface with the broken wires shown protruding therefrom; Fig. 2 is a cross-section of the device showing the magnetic core structure with the microphone disposed adjacent the base of the core; Fig. 3 is a wiring diagram showing the arrangement of the circuits including the battery and receiver; Fig. 4 is a transverse section along line 4—4 of Fig. 2; Fig. 5 is a partial section of an optional arrangement showing the threaded adjustable portion disposed upon the outer core structure; Fig. 6 is a longitudinal section of an optional arrangement wherein the outer core surface comprises a casing; Fig. 7 is an end view of Fig. 6.

In carrying out the objects of my invention I provide an electromagnet of any convenient shape. I show one form comprising inner and outer cores 3 and 2 respectively, joined at the base so that the outer core forms a cup shaped member within which a solenoid coil 10 may be placed filling the space between the inner and outer cores. Abutting the base of the core, I place the microphone unit 11 comprising the diaphragms 13 and 14, one of which is in contact with the core base. The carbon granules 12 are disposed between the two diaphragms. The microphone may be firmly fixed to the core base by any convenient means. Around the exterior of the magnet and microphone structure, I may provide a casing 5 which may be made of any suitable insulating material. I have found that a layer of shellac between the core and the casing serves to join the casing to the core when a casing is found desirable. The casing 5 may have an internal annular shoulder 6 adapted to abut the core as shown so that the microphone and leads will be subjected to no pressure due to the positioning of the casing. In the casing at 4 there may be cut an aperture through which the wires leading to the solenoid and to the microphone may pass. The core structure and casing may be made in any convenient shape but it is thought that the cylindrical form shown may be best adapted. In the forms shown in Figs. 1 and 2, I contemplate finishing the exposed ends of the cores to provide a plane surface at 7 normal to the axis of the casing which may include the ends of both the inner and outer core members and the edge of the casing. The corners of the casing may be rounded as at 8 to obviate the chance of the casing intervening if the unit is to cling to a slightly concave surface.

In using my device I have found that better results may be attained particularly on irregular surfaces by providing relative movement between the ends of the inner and outer cores so that any undesired air gap may be reduced to a minimum. Thus, in Fig. 5, I show the outer core threaded, as at 41, with a sleeve portion 40 engaging the threads so that in effect the core may be extended or retracted as desired. In this construction I provide for the inner core normally extending beyond the main portion of the outer core so that when the sleeve 40 is retracted the unit will be best adapted to fit into a concave surface. By then extending the sleeve beyond the end of the inner core the unit may closely fit over a convex surface. It can readily be seen that special forms or shapes of the projecting end of the sleeve 40 may be made which may be threaded onto the outer core that will be adapted to fit into odd or jagged surfaces, see dotted line Q in Fig. 5.

In Fig. 6 I show an optional arrangement of constructing the cores 2 and 3, and in placing a commercial microphone construction in threaded engagement with the base of the core 3, I provide threads at 42 on the edge of the base of the core member 3 and within the core member 2. The shoulder 43 at the inner end of the outer threads provides a stop so that the microphone and lead wires may be protected. I provide a slot 44 adapted to engage a screw driver so that the relative longitudinal positions of the cores 2 and 3 may be varied to fit either concave or convex surfaces. A further advantage of this construction is that the solenoid 10 may be wound directly on the inner core and the microphone unit may be attached thereto, and then the inner core with the solenoid and microphone may be threaded into the outer core. A further advantage is that the outer core serves the dual function of providing a path for the magnetic flux and also of serving as a casing to protect the microphone and the windings.

In Fig. 3 there is shown a wiring diagram embracing the several parts which may be most readily used in operating my device. Thus at 30 is shown the battery with one lead 22 connected with one of the diaphragms 14 of the microphone. The path of the current continues through the microphone via the carbon granules to the diaphragm 13 through the lead 21 to the phone 33, thence back to the battery through the switch 32. The solenoid 10 may best be placed in a separate circuit as shown embracing part of the lead 22 then 23, the coil 10 and the lead 20 back to the battery. The switch 31 may be placed in the line 20 to afford separate means for opening and closing the solenoid circuit.

It will be seen from the foregoing description that I have provided a sound detecting device of very simple construction that makes possible the use of the microphone in a great many ways which have heretofore been regarded as impossible or at least highly impracticable. The association of a microphone with an electro-magnet not only broadens the use to which a microphone may be put, but makes certain far more efficient and exacting results than have heretofore been obtained.

Having thus described my invention, I claim:

1. In a sound detecting device, the combination of an electromagnet comprising a solenoid and core members, one core member disposed within the solenoid and the other without, said core members being longitudinally movable relative to each other, and a microphone attached to one of the core members and adapted to respond to vibrations transmitted through the core member.

2. In a sound detecting device the combination of an electromagnet comprising a cup-shaped core, a solenoid positioned therein and an inner core positioned within the solenoid, said inner core being in threaded engagement with the cup-shaped core whereby relative longitudinal movement can be effected between the two core members and a microphone attached to the magnet and adapted to respond to vibrations transmitted therethrough.

3. In a sound detecting device, the combination of an electromagnet comprising a solenoid and core members, said core members being movable relative to each other, and a microphone attached to one of the core members and adapted to respond to vibrations transmitted through the core member.

4. In a sound detecting device, the combination of an electromagnet comprising relatively movable parts adapted to be positioned relative to each other to present various composite exterior surfaces, and a microphone attached to the magnet and adapted to respond to vibrations transmitted therethrough.

In testimony whereof, I hereunto affix my signature.

MATHEW J. KALTENBACH.